(12) United States Patent
Harvey et al.

(10) Patent No.: US 8,007,868 B2
(45) Date of Patent: *Aug. 30, 2011

(54) CONTROL OF MORPHOLOGY OF SILICA FILMS

(75) Inventors: Michael Harvey, Brisbane (AU); Paul Meredith, Brisbane (AU)

(73) Assignee: Xerocoat Inc., Redwood City, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 11/921,124

(22) PCT Filed: May 31, 2006

(86) PCT No.: PCT/AU2006/000733
§ 371 (c)(1),
(2), (4) Date: Jan. 15, 2008

(87) PCT Pub. No.: WO2006/128232
PCT Pub. Date: Dec. 7, 2006

(65) Prior Publication Data
US 2008/0292889 A1   Nov. 27, 2008

(30) Foreign Application Priority Data
May 31, 2005   (AU) .................. 2005902785

(51) Int. Cl.
*B05D 3/10*   (2006.01)
(52) U.S. Cl. ...... 427/335; 427/240; 427/387; 427/430.1

(58) Field of Classification Search .................. None
See application file for complete search history.

(56) References Cited

U.S. PATENT DOCUMENTS

| | | | | |
|---|---|---|---|---|
| 3,083,639 A * | 4/1963 | Thurlow | ............... | 101/465 |
| 4,652,467 A | 3/1987 | Brinker et al. | | |
| 5,262,201 A * | 11/1993 | Chandra et al. | ............. | 427/376.2 |
| 5,698,266 A | 12/1997 | Floch et al. | | |
| 5,753,305 A * | 5/1998 | Smith et al. | ............... | 427/335 |
| 6,063,714 A * | 5/2000 | Smith et al. | ............... | 438/778 |
| 6,231,989 B1 | 5/2001 | Chung et al. | | |
| 6,518,205 B1 * | 2/2003 | Wu et al. | ............... | 438/782 |
| 7,642,199 B2 * | 1/2010 | Meredith et al. | ............ | 438/781 |
| 2006/0286813 A1 | 12/2006 | Meredith et al. | | |
| 2007/0148435 A1 | 6/2007 | Meredith et al. | | |

FOREIGN PATENT DOCUMENTS

| | | |
|---|---|---|
| JP | 96-007064/01 | 10/1995 |
| JP | 2002-551312/59 | 1/2002 |
| WO | WO-99/23101 A1 | 5/1999 |
| WO | WO-00/13221 A1 | 3/2000 |
| WO | WO-2005/049757 A1 | 6/2005 |

* cited by examiner

*Primary Examiner* — Erma Cameron
(74) *Attorney, Agent, or Firm* — Harness, Dickey & Pierce, P.L.C.

(57) ABSTRACT

A method of controlling the morphology of silica or silica-like films formed by coating a precursor formulation of hydrolysable silicate oligomer onto a substrate and curing in a vaporous environment that comprises a base, water and a retarder that retards the hydrolysis of the oligomer.

21 Claims, 2 Drawing Sheets

CONTROL OF MORPHOLOGY OF SILICA FILMS

FIELD OF INVENTION

This invention relates to silica films and silica-like films, a method of production thereof and the use of the films as anti-reflective and/or anti-fogging and/or protective coatings. In particular the invention relates to control of morphology of silica films and silica-like films.

BACKGROUND

The inventors have previously invented a silica film having particularly advantageous properties. The film has useful anti-fogging and anti-reflection properties, amongst other potentially useful properties. One method of production of one form of the silica film is described in our co-pending International Application number WO 2005/049757 published 2 Jun. 2005.

Typically low refractive index thin films are made utilising sol-gel processes or vacuum evaporation deposition techniques. The known processes which rely on sol-gel techniques for producing thin films are complex, multi-step processes which are costly, involve high temperature and/or pressure steps in fabrication, and/or require a surfactant for templating. The films produced by these sol-gel processes are typically easy to damage and/or liable to delamination.

The following prior art documents are but a few examples of methods used to produce low refractive index films made from silica.

A number of prior art processes based on known sol-gel technology were described in our earlier application. In addition to those previously discussed, reference may also be had to U.S. Pat. No. 4,652,467. This patent describes a process of depositing a thin film on a substrate from a non-gelled solution made from alcohol and various hydrolysable metal alkoxides, such as TEOS. The described process aims to control porosity and pore size but is quite complex. The process includes adjusting temperature, pH and standing time before chilling, curing and heating to form the film.

U.S. Pat. No. 5,698,266 is directed to a modification of the standard sol-gel method of forming an anti-reflective coating by mixing ethanol, tetraethoxysilane (TEOS) and ammonia and hydrolysing for up to 48 hours to form a colloidal silicon oxide suspension dispersed in an aliphatic alcohol. The silica sol is then filtered to obtain silica particles for deposition onto a substrate, prior to drying. The coated substrate is placed in an ammoniacal environment for up to twelve hours to form an anti-reflective coating. This final step is claimed to improve the binding between the silica particles, and so renders the film more robust.

One of the few prior art processes for producing silica coatings without directly following the conventional sol-gel process is described in U.S. Pat. No. 6,231,989 assigned to Dow Corning Corporation. The patent describes a process of forming a coating from a solution comprising a resin containing at least two Si—H groups in a solvent, such as methylisobutylketone. The solution is coated to a substrate with about 5% of the solvent remaining in the coating. An aqueous basic catalyst causes condensation of the Si—H groups. The solvent is evaporated to leave a porous coating. In summary, the method uses an ammonia vapour step to improve adhesion and mechanical strength of the resultant film, but relies in the main part upon conventional sol-gel methods to produce the coating at room temperature and pressure. The preparation of suitable starting materials containing two Si—H groups is difficult, which limits the usefulness of the technique.

None of the known techniques use simple processing steps to produce films with controlled morphology, such as porosity and pore size.

SUMMARY OF THE INVENTION

In one form, although it need not be the only or indeed the broadest form, the invention resides in a method of forming a silica or silica-like film coated on a substrate including the steps of:

producing a precursor formulation by adding to a solvent an hydrolysable silicate oligomer of the form:

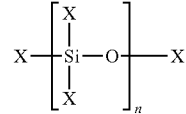

where each X is independently selected from a range of hydrolysable or non-hydrolysable groups with the proviso that at least three X must be hydrolysable groups;

forming a coating of the precursor formulation on the substrate;

and then curing the coating by hydrolysing and condensing the coating in a vapourous environment that comprises a base, water and a retarder, said retarder retarding hydrolysis of the hydrolysable silicate oligomer.

Suitably the step of curing may include the steps of:

placing the coated substrate in a chamber with the retarder vapour; and subsequently introducing water and a base into the chamber.

The hydrolysable silicate oligomer is suitably derivable from a molecular precursor of the form

where n=3 or 4, m=4-n, each R is independently selected from a range of hydrolysable groups, and each X is a non-hydrolysable group independently selected from a range of non-hydrolysable groups.

Suitably the method further includes the step of morphology control of the film by controlling respective partial pressures of the base, the retarder and the water in the vapourous environment.

The method may include additional morphology control of the film by selecting the solvent to control pore size and selecting the concentration of solvent and/or retarder to control pore density.

The coating step is suitably performed by spin coating or dip coating. The method may further include the step of allowing the coating to settle before curing.

It will be appreciated that the precursor is liquid during the coating step (before curing) and preferably at neutral pH, so the method does not follow the conventional sol-gel process described in the prior art. It will be further appreciated that the vaporous environment is responsible for controlling the rates of hydrolysis and polycondensation in the post-deposited film, to create a nanoporous, stable, highly cross-linked silica or silica-like network.

Suitably the pore size may be related to the size of the solvent molecule. The solvent content in the precursor relates to the pore density which may also be related to the retarder content in the ammoniacal environment.

The method is suitably carried out at or near room temperature and atmospheric pressure.

Another form of the invention provides a method of forming a precursor formulation, including the steps of:
mixing an hydrolysable silicate oligomer of the form:

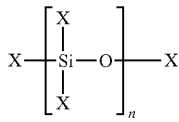

where each X is independently selected from a range of hydrolysable or non-hydrolysable groups with the proviso that at least three X must be hydrolysable groups; with a solvent.

In a further form, the invention resides in a precursor formulation comprising;
about 1 part hydrolysable silicate oligomer of the form:

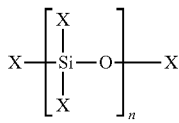

where each X is independently selected from a range of hydrolysable or non-hydrolysable groups with the proviso that at least three X must be hydrolysable groups;
about 0.2-100 parts alcohol; and
about 0.01-1 part water.

In a still further form the invention resides in a film having a refractive index between 1.1 and 1.56 and a film thickness less than 100 microns formed by the above method.

In yet another form the invention provides for the use of the film coated on a transparent substrate to provide an anti-reflective and/or anti-fogging and/or protective coating.

In yet another form the invention provides a hydrophilic film. Preferably the hydrophilic film has a high surface area.

In one form of the invention the hydrolysable silicate oligomer is not silicic acid tetramethyl ester homopolymer.

Throughout the specification the term "low refractive index" is intended to refer to a film of the invention having a refractive index less than silica glass in the wavelength range 200 nm to 20 µm.

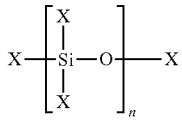

Figure 1:
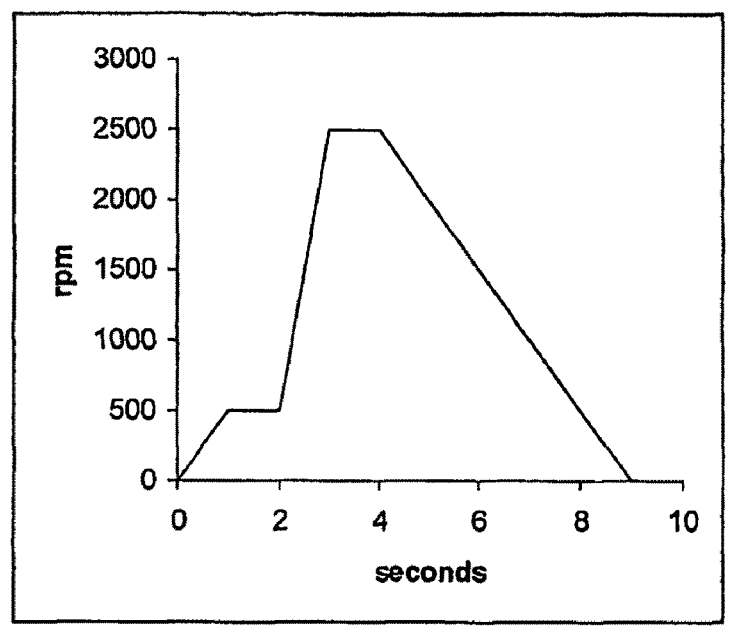
FIG. 1 is a spin profile for coating a substrate.

where at least three of the X groups are hydrolysable groups. Selection of the X groups is not particularly restricted and is discussed further below. Particular examples of these materials include methyl silicate and ethyl silicate, which are oligomeric forms of tetramethyl orthosilicate and tetraethyl orthosilicate, respectively. These materials are also known as tetramethoxy-silane and tetraethoxy-silane.

By way of example, the oligomer can be formed from the monomer by partial hydrolysis, as depicted in the following reactions:

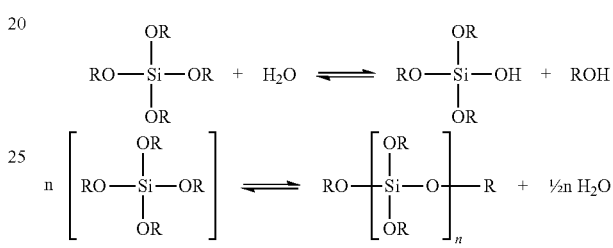

For commercially available methyl silicate n is typically 4 and for ethyl silicate it is typically 5. The degree of polymerisation in the oligomer is not particularly important.

When X is an hydrolysable group it is independently selected from a range of hydrolysable groups including but not limited to $C_1$-$C_{10}$ alkyl, preferably $C_1$-$C_4$ alkyl, aryl inclusive of phenyl or naphthyl, optionally substituted aryl, aryl $C_1$-$C_4$ alkyl inclusive of benzyl.

It will also be appreciated that X may be optionally substituted with one or more inert substituent such as halide, for example fluorine; aryls; heteroaryls; or any nitrogen, oxygen or sulphur containing substituent which does not interfere with the formation of the silica film.

When X is a non-hydrolysable group it is independently selected from a range of non-hydrolysable groups consisting of alkyl, alkenyl, aryl or alkyl, alkenyl or aryl groups optionally substituted with halogen, nitrogen, oxygen, sulphur or silicon.

The inventors have realised that the morphology of thin silica films can be controlled in a single step, liquid phase, curing process by adding alcohol to the curing environment. For example, the hydrolysis reaction equation during curing of tetraethoxy silicate ($R=C_2H_5$) is:

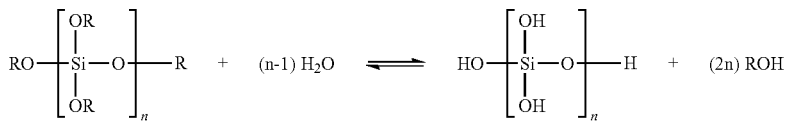

DETAILED DESCRIPTION OF THE INVENTION

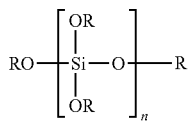

The hydrolysable silicate oligomers of the invention have the general form:

The inventors have appreciated that certain hydrolysable silicate oligomers can be prepared in the liquid phase for coating onto substrates. In the earlier patent application mentioned above a process was described for forming a thin film from silicic acid tetramethyl ester homopolymer (specifically methyl silicate 51), but the process of morphology control was not detailed.

It is noted that the production of alcohol (ROH) limits the rate of the hydrolysis reaction. It has been found that the introduction of alcohol to the curing environment controls the rate of hydrolysis and hence properties of the film formed in the condensation step. It is important that the alcohol in the curing environment is sufficiently volatile so as to have a partial pressure at the curing temperature. For convenience it is preferable to carry out the curing process at room temperature. Excess alcohol in the environment slows the rate of hydrolysis.

Suitably the base is any base which is sufficiently volatile to have a partial pressure at the curing temperature, which is conveniently at or about room temperature. The base may be selected from volatile inorganic or organic bases. More suitably the base is a volatile inorganic base such as volatile nitrogenous base, exemplified by ammonia, a volatile aminoalkane inclusive of a primary amine, a secondary amine or a tertiary amine, or a volatile amino-alkene, alkaloids and the like. Most suitably the base is ammonia.

The solvent is any solvent in which the oligomer is soluble. The inventors have found that an alcohol is most suitable. Suitable alcohols include methanol, ethanol, iso-propyl alcohol, butanol, pentanol and certain other polyols such as ethylene glycol.

The retarder preferably comprises one or more alcohols or polyols. The retarder is preferably the alcohol that is formed during curing although homologous alcohols also retard the hydrolysis. Examples of such combinations of retarder, ROH and solvent contemplated by the present invention may include ROH being any alkyl alcohol, the solvent being methanol and the retarder vapour being ethanol. It will be appreciated that other combinations may also be employed.

Thus, in one non-limiting example where all X are ethoxy and n=4, eg. $Si(OC_2H_5)_4$, the retarder is ethanol. In such an example, it is preferred that the solvent is also ethanol.

It will also be appreciated that the hydrolysable silicate oligomer need not have all X-groups the same. For example, $CH_3[(OC_2H_5)_2SiO]_nC_2H_5$ is anticipated to be a suitable precursor, as is $C_3H_7[(OC_2H_5)(OCH_3)SiO]CH_3$.

In these particular examples the alcohol in the curing environment may be methanol, ethanol, propanol, or a combination of these.

Optionally, it may be appropriate for the coated substrate to sit in an alcohol atmosphere for a time to allow equilibrium to be established between the alcohol in the atmosphere and the alcohol content of the silica precursor formulation on the substrate before introducing water and base to commence condensation.

The general process for forming the films commences with the preparation of a precursor formulation. A quantity of hydrolysable silicate oligomer is mixed with alcohol. Optionally a small amount of water, typically less than 5% by volume, may also be present. The amount of water dissolved in the alcohol from the environment is often sufficient and is virtually unavoidable. The hydrolysable silicate oligomer is suitably methyl silicate, ethyl silicate, more complex oligomers derived from monomers such as tetrapropoxysilane or tetrabutoxysilane, or oligomers derived from mixed organosilicate esters such as dimethoxydiethoxysilane, tetraisopropoxysilane, etc.

The precursor formulation may comprise any alcohol that creates dispersed droplets throughout the silica precursor formulation and facilitates the formation of pores in the final film.

A number of exemplary processes for producing suitable films are described below.

EXAMPLE 1

Ethyl Silicate 40

50 ml of ethyl-silicate-40 (comprising >94% silicic acid tetraethyl ester homopolymer, <4% tetraethoxysilane, <4% ethanol) {supplied by COLCOAT CO. LTD. 3-28-6 Omorinishi, Ota-ku, Tokoyo 143-0015, Japan} is added to 100 ml of ethanol or methanol to form a precursor formulation.

The precursor formulation may comprise any alcohol that creates dispersed droplets throughout the precursor formulation to facilitate the formation of pores in the final film.

The precursor formulation is applied to a substrate, in this example a glass slide, by dip coating.

It will be appreciated that other deposition techniques such as spin coating and spraying may also be used to apply the silica precursor formulation to a substrate. A typical spin coating profile is to ramp to 500 rpm in 1 sec, spin for 1 sec at 500 rpm, ramp to 2500 rpm in 1 sec, spin at 2500 rpm for 1 sec, ramp down at 500 rpm per sec for 5 sec, as shown in FIG. 1

It will be appreciated that spin deposition conditions may be varied depending on the film thickness and refractive index desired.

The coated substrate is then place in a closed container of approximately 30 litres volume containing a curing agent (20 ml aqueous ammonia 28% solution and 20 ml alcohol), which creates an appropriate ammoniacal atmosphere for the silica film to cure. The container is arranged in such a manner that the film is never in contact with the curing liquid. This curing step continues until the film solidifies and becomes mechanically robust.

Although it is convenient to add the water and base as an aqueous ammonia solution it will be appreciated that each can be added separately. In fact, the inventors believe that better morphology control is achievable if the base and water are introduced separately to the reaction chamber.

Figure 2:
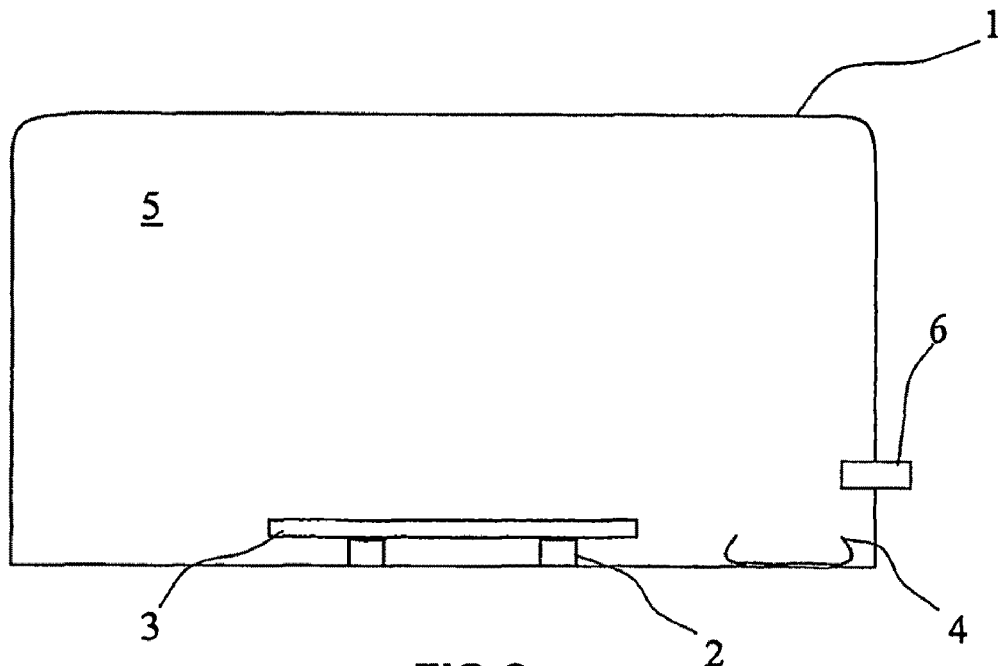
FIG. 2 is a schematic of a curing chamber.

A schematic of a curing chamber 1 is shown in FIG. 2. The chamber 1 is a closed system having some form of mount 2 in the base for receiving the substrate 3. A reservoir 4 is filled with a mixture of ammonia, alcohol and water which evaporates to produce an atmosphere 5 having a composition determined by the partial pressures of the ammonia, water and alcohol at the applicable temperature and pressure. A port 6 may be provided so that the mixture in the reservoir can be adjusted without opening the chamber.

The porosity of the produced film is determined, at least in part, by the alcohol in the precursor formulation prior to curing. The alcohol in the precursor formulation is understood to produce pores in the film which remain after curing. The density of the pores is determined, at least in part, by the amount of alcohol present in the precursor formulation during curing, whereas the size of the pores is determined by the type of alcohol. A large polyol produces a larger pore size than, say, methanol or ethanol.

During the curing stage the water in the ammoniacal atmosphere causes hydrolysis of the precursor formulation. An exchange of alcohol molecules from the precursor formulation and the alcohol molecules in the ammoniacal atmosphere occurs allowing the alcohol of the ammoniacal atmosphere, or curing environment, to take part in the hydrolysis reaction. This means that the final porosity of the film is controlled by placing the coated substrate in an alcohol environment prior to introducing ammonia to the chamber to catalyse the cross-linking reaction.

It will be appreciated that the prior art processes, such as found in U.S. Pat. No. 5,698,266, produce films of weakly bonded nano-particles of silica whereas the process described above produces a continuous, interconnected, nano-porous silica network. Hence the film is stronger and the characteristics of the film (porosity and refractive index) can be controlled.

The films of this example, and films produced in a similar manner to this example, have been physically characterised as outlined in our co-pending application WO 2005/049757, the content of which is incorporated herein by reference.

EXAMPLE 2

Ethylytrimethoxysilane

Monomeric ethyltrimethoxysilane (ETOS) {supplied by Sigma-Aldrich, Castle Hill, NSW Australia} is mixed with water in the molar ratio of 1 part ETOS to 2 parts water with sufficient ethanol added to dissolve the ETOS. This mixture is allowed to react and form a silicate oligomer.

The precursor formulation is formed by adding 10 ml ethanol or methanol to 10 ml of the silicate oligomer.

The precursor solution is applied to a substrate, in this example a glass slide, by placing some drops of the precursor solution on the surface and allowing them to spread and flow under gravity.

The coated substrate is then place in a closed container of approximately 30 litres volume containing a curing agent (20 ml aqueous ammonia 28% solution and 20 ml alcohol), which creates an appropriate ammoniacal atmosphere for the silica film to cure.

EXAMPLE 3

Methyltrimethoxysilane

Monomeric methyltrimethoxysilane (MTOS) {supplied by Sigma-Aldrich, Castle Hill, NSW Australia} is mixed with water in the molar ratios of 1 part MTOS to 3 parts water with sufficient ethanol added to dissolve the MTOS. This mixture is allowed to react and form a silicate oligomer. Other ratios of 1 part MTOS to 2 parts or 4 parts water were also found to be suitable.

The precursor formulation is formed by adding 10 ml ethanol or methanol to 10 ml of the silicate oligomer. Other dilutions of 20 ml, 40 ml ad 80 ml ethanol were also found to be suitable.

The coated substrate is then place in a closed container of approximately 30 litres volume containing a curing agent (20 ml aqueous ammonia 28% solution and 20 ml alcohol), which creates an appropriate ammoniacal atmosphere for the silica film to cure.

It is hypothesized that in the instances where the alcohol of the ammoniacal environment, or curing vapour, is different to that in the precursor formulation that a mixed oligomer is formed during the hydrolysis reaction. It is believed that initially there is a degree of reaction control, in which the alcohol of both the precursor formulation and the ammoniacal environment contribute to the overall hydrolysis reaction rate and size of the pores formed in the silica film. For example, if the precursor formulation comprises methyl silicate and methanol and the curing vapour comprises ethanol, during the hydrolysis reaction methanol is formed from the methyl silicate. This reaction is reversible and the methanol may come out of the curing vapour and reform on the silica. Ethanol will also react with the silica in a similar reversible reaction. Considering one bond on the methyl silicate oligomer at a time, an $OCH_3$ group comes off the precursor as methanol and that site is hydrolysed. The reaction can reverse with either ethanol or methanol (produced by the hydrolysis reaction) from the curing vapour and so the reverse reaction and may use either alcohol from the curing vapour. The methyl silicate oligomer may then become a mixed oligomer, and the hydrolysis is reversed by the alcohol from the curing vapour and it acts as the retarder, even though it was not initially in the precursor formulation.

It is also believed that the solvent content of the precursor formulation is involved in the film formation at a mesoscale to impact on the pore density. The coating exchanges volatiles in and out of the curing vapour. The alcohol in the curing vapour will be somewhat incorporated into the film and some of the free alcohol in the film will be lost to the curing vapour. The amount and type of alcohol in both the precursor formulation and the curing vapour may combine to influence the pore density of the silica film.

Figure 3:
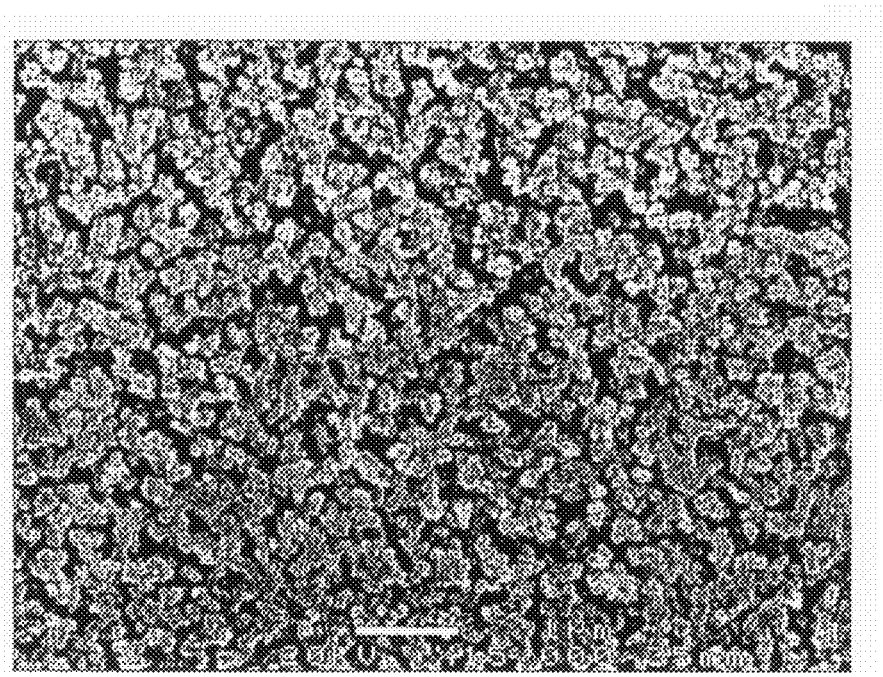
FIG. 3 is an image of a first film.
Figure 4:
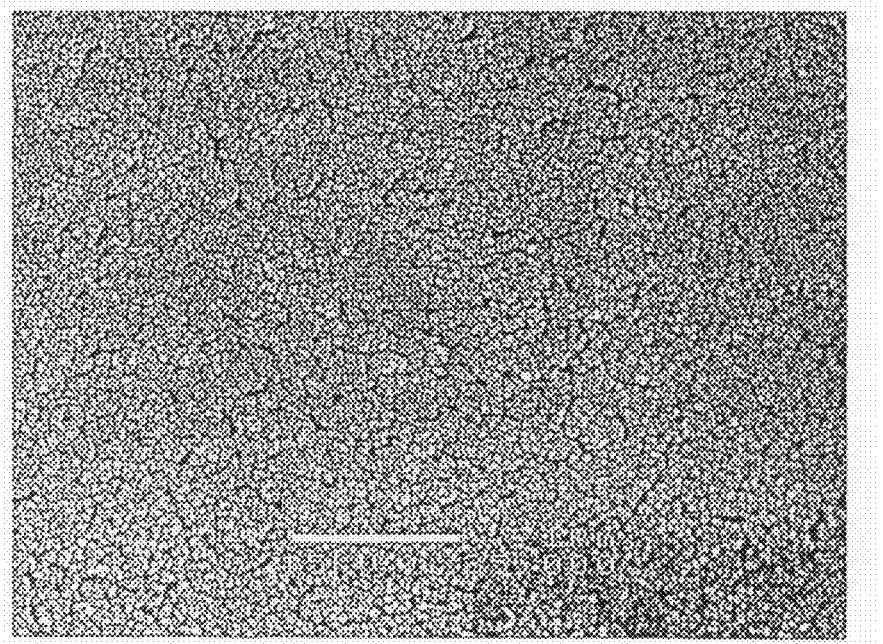
FIG. 4 is an image of a second film.

The control of morphology is exemplified by the electron microscope images of FIG. 3 and FIG. 4. The film shown in FIG. 3 is controlled to have a refractive index of 1.21. The film shown in FIG. 4 has a refractive index of 1.30. In each case the scale of the image is shown by the white line which is 1 μm. Clearly the pore size and density is different for each film.

The films produced by these methods have a number of favourable characteristics, including:
  a low refractive index in the visible spectrum, typically 1.1 to 1.45;
  high optical transparency;
  high optical and thickness uniformity;
  mechanical robustness similar to glass;
  chemical and photochemical properties similar to glass;
  high porosity, leading to efficient anti-fogging behaviour;
  excellent adhesion to conventional substrates, such as glasses,
  plastics, metals, ceramics, semiconductors, and the like; and
  durability/long term stability.

A number of features of the films of the current invention may be tailored or tunable to suit the final application of the film, for example;
  Tunable refractive index—The refractive index may be tuned according to need by adjusting the composition, in particular the alcohol and water content.
  Tunable film thickness—The film thickness can be tuned by adjusting the initial alcohol and water contents in the precursor formulation and, can also be adjusted by varying the parameters relating to the deposition method, such as spin speed, viscosity, dip coating withdrawal rate, and the like using standard methods for the chosen coating technique.

The viscosity of the precursor formulation may be altered to facilitate its use in a range of applications, for example, a highly viscous formulation may be formed so that when sprayed onto a substrate to create a thin coverage of the precursor it does not flow significantly whilst curing.

The method of the current invention provides a low cost simple method for producing robust films with effective control over the thickness and refractive index of the coating, along with being able to coat a range of substrate materials and shapes.

The above properties make the films ideal candidates for cheap, robust, efficient optical coatings for applications including antireflection coatings, chemical and mechanical barrier coatings, anti-fogging coatings, anti-glare coatings (light diffusing effect), high reflectivity coatings, highly scattering coatings for frosted layers, low refractive index supports and cladding and dielectric barrier layers.

The films of the invention may be employed as low refractive index optical coatings for anti-reflection coatings or as low and high refractive index materials in high-low refractive index multilayer coatings. As a low refractive index optical coating the silica thin films may be applied to all forms of glass including spectacles, windows, windscreens, decorative, etc.; coatings for CRT and other display devices such as computer monitors, televisions, etc.; coatings for solar cells; optical instrument coatings such as lenses, mirrors, and the like; active and passive optical waveguides in telecommunications, and advanced photonics; and optoelectronic devices.

The films may also be used as physical and chemical barrier coatings including, invisible metal and plastics protection, invisible protection for delicate optical surfaces.

The films may also be used as anti-fogging coatings for applications including automotive and marine glass, architectural glass, spectacles, windows of all sorts, bathroom mirrors and shower screens.

The films may also be produced with an additional component imbedded in the porous network to make the film an active coating. The nanoporous structure of the film also makes it potentially useful as a nanosieve.

It will be appreciated by the person skilled in the art that the above films may be formed on or applied to glass surfaces that are already in place, such as existing windows and mirrors. In aftermarket applications the silica precursor formulation may be mixed with the curing agent immediately prior to application, mixed during application such as through a common spray nozzle or after the precursor has been applied to a substrate. The precursor may be applied by coating, wiping or spraying the respective component onto the substrate being treated. The curing agent may be any gaseous or aqueous strong alkali, including ammonia, alkali metal hydroxides, quaternary alkyl ammonium hydroxides and the like.

Throughout the specification the aim has been to describe the preferred embodiments of the invention without limiting the invention to any one embodiment or specific collection of features.

Throughout this specification, unless the context requires otherwise, the word "comprises", and variations such as "comprise" or "comprising", will be understood to imply the inclusion of a stated integer or group of integers or steps but not to the exclusion of any other integer or group of integers.

The invention claimed is:

1. A method of forming a silica film coated on a substrate including the steps of:
   producing a silica precursor solution by dissolving in a solvent a hydrolysable silicate oligomer of the form:

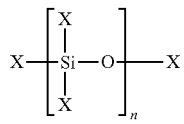

where each X is independently selected from a hydrolysable or non-hydrolysable group with the proviso that at least three X must be hydrolysable groups and wherein n is an integer between 2 and 10 and wherein the hydrolysable silicate oligomer is not silicic acid tetramethyl ester homopolymer;

forming a coating of the silica precursor solution on the substrate; and curing the coating of the silica precursor solution by hydrolysing and condensing the coating in a vaporous environment comprising a base, water and a retarder, said retarder retarding hydrolysis of the hydrolysable silicate oligomer to form a film, wherein the concentration of said retarder in the vaporous environment is selected to control the morphology of the film.

2. The method of claim 1 wherein the step of curing includes the steps of:
   placing the coated substrate in a chamber with the retarder vapour; and
   subsequently introducing water and a base into the chamber.

3. The method of claim 2 further including the step of allowing the coating to equilibrate with the retarder vapour before introducing water and base to the chamber.

4. The method of claim 1 wherein when X is a hydrolysable group it is selected from the group consisting of $C_1$-$C_{10}$ alkoxy, aryloxy, substituted $C_1$-$C_{10}$ alkoxy and substituted aryloxy.

5. The method of claim 1 wherein when X is a non-hydrolysable group it is selected from the group consisting of alkyl, alkenyl and, aryl, all of which may be substituted with halogen, nitrogen, oxygen, sulphur or silicon.

6. The method of claim 1 wherein X is substituted with one or more inert substituents selected from the group consisting of halides, heteroaryls, and any nitrogen, oxygen or sulphur containing substituent not interfering with the formation of the film.

7. The method of claim 1 wherein the base is a volatile organic base selected from the group consisting of ammonia, a volatile amino-alkane inclusive of a primary amine, a secondary amine or a tertiary amine, a volatile amino-alkene and an alkaloid.

8. The method of claim 1 wherein the base is ammonia.

9. The method of claim 1 wherein the solvent is an alcohol selected from the group consisting of methanol, ethanol, isopropyl alcohol, butanol, pentanol and a polyol.

10. The method of claim 1 wherein the hydrolysable silicate oligomer is derivable from a molecular precursor of the form $$X_m Si(OR)_n$$

where n=3 or 4,
m=4-n,
each R is independently a hydrolysable groups, and
each X is independently a non-hydrolysable group.

11. The method of claim 1 further including the step of controlling morphology of the film by controlling respective partial pressures of the base, the retarder and the water in the vaporous environment.

12. The method of claim 1 further including the step of selecting the solvent to control pore size in the film.

13. The method of claim 1 further including the step of selecting the concentration of solvent to control pore density in the film.

14. The method of claim 1 further including the step of selecting the concentration of retarder in the vaporous environment to control pore density in the film.

15. The method of claim 1 wherein the step of forming a coating is performed by spin coating or dip coating.

16. The method of claim 15 wherein the coating conditions influence the final film thickness.

17. The method of claim 15 wherein the coating conditions influence the refractive index of the film.

18. The method of claim 1 wherein the silica precursor solution is produced at or near neutral pH.

19. The method of claim 1 wherein the silica precursor solution contains less than 5% water by volume.

20. The method of claim 1 wherein the curing step is performed at or near room temperature and ambient pressure.

21. The method of claim 1 wherein the film has a refractive index between 1.1 and 1.56 and a thickness less than 100 microns.

* * * * *